(12) United States Patent
Dayal et al.

(10) Patent No.: US 9,755,767 B2
(45) Date of Patent: Sep. 5, 2017

(54) MECHANISM TO MEASURE, REPORT, AND ALLOCATE A HIGHEST POSSIBLE RANK FOR EACH CELL IN A CARRIER AGGREGATION (CA) MODE RECEIVER-LIMITED USER EQUIPMENT (UE)

(71) Applicant: QUALCOMM Incorporated, San Diego, CA (US)

(72) Inventors: Abhinav Dayal, San Diego, CA (US); Manjinder Singh Sandhu, Poway, CA (US); Madhusudan Kinthada Venkata, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 14/530,662

(22) Filed: Oct. 31, 2014

(65) Prior Publication Data
US 2016/0127055 A1    May 5, 2016

(51) Int. Cl.
*H04B 17/309*    (2015.01)
*H04W 24/10*    (2009.01)
*H04B 7/0413*    (2017.01)
*H04W 16/24*    (2009.01)
*H04B 7/04*    (2017.01)
(Continued)

(52) U.S. Cl.
CPC ......... *H04B 17/309* (2015.01); *H04B 7/0413* (2013.01); *H04B 7/0486* (2013.01); *H04B 7/063* (2013.01); *H04L 5/001* (2013.01); *H04L 5/006* (2013.01); *H04L 5/0023* (2013.01); *H04L 5/0028* (2013.01); *H04L 5/0085* (2013.01); *H04L 5/0091* (2013.01); *H04W 16/24* (2013.01); *H04W 24/10* (2013.01); *H04L 5/0048* (2013.01); *H04L 5/14* (2013.01)

(58) Field of Classification Search
CPC .... H04B 7/0413; H04B 7/0486; H04B 7/063; H04L 5/001
See application file for complete search history.

(56) References Cited

U.S. PATENT DOCUMENTS 8,731,038 B2 * 5/2014 Pean ............... H04L 1/0001
                                                      370/210
9,070,974 B2 * 6/2015 Hu ................. H04B 7/0608
(Continued)

OTHER PUBLICATIONS

LTE-Advanced Physical Layer—IMT-Advanced Evaluation Workshop Dec. 17-18, 2009.*
(Continued)

*Primary Examiner* — Jeffrey M Rutkowski
*Assistant Examiner* — Basil Ma
(74) *Attorney, Agent, or Firm* — Patterson & Sheridan, L.L.P

(57) ABSTRACT

Certain aspects of the claimed invention generally relate to a network dynamically configuring one or more cells based on signal quality measurements received from all antennas of a receiver-limited UE. The receiver-limited UE may have a number of receivers that is less than or equal to a number of antennas of the UE. Further, the UE may be capable of operating in a CA mode. Dynamically configuring the one or more cells based, at least in part, on the received signal quality measurements may allow the UE to operate on M×N MIMO on the Pcell or Scell.

20 Claims, 8 Drawing Sheets

(51) Int. Cl.
*H04B 7/06* (2006.01)
*H04L 5/00* (2006.01)
*H04L 5/14* (2006.01)

(56) References Cited

U.S. PATENT DOCUMENTS

| | | | |
|---|---|---|---|
| 9,282,498 B2* | 3/2016 | Huang | H04W 36/28 |
| 2013/0194947 A1 | 8/2013 | Ehsan et al. | |
| 2013/0201834 A1 | 8/2013 | Klingenbrunn et al. | |
| 2013/0308477 A1* | 11/2013 | He | H04B 7/0608 |
| | | | 370/252 |
| 2013/0315157 A1 | 11/2013 | Krishnamurthy et al. | |
| 2013/0329665 A1* | 12/2013 | Kadous | H04W 72/048 |
| | | | 370/329 |
| 2013/0344868 A1 | 12/2013 | Yamada | |
| 2014/0146907 A1 | 5/2014 | Kim et al. | |
| 2014/0169315 A1 | 6/2014 | Han et al. | |
| 2014/0233489 A1* | 8/2014 | Bostrom | H04L 5/0051 |
| | | | 370/329 |
| 2014/0273884 A1* | 9/2014 | Mantravadi | H04B 1/38 |
| | | | 455/73 |
| 2015/0188582 A1* | 7/2015 | Kahrizi | H04B 1/0067 |
| | | | 455/77 |
| 2015/0304004 A1* | 10/2015 | Kim | H04B 7/0413 |
| | | | 370/329 |
| 2016/0072656 A1* | 3/2016 | Nilsson | H04L 27/2647 |
| | | | 375/316 |

OTHER PUBLICATIONS

Partial International Search Report—PCT/US2015/053471—ISA/EPO—Dec. 23, 2015.
Ericsson et al., "Physical Layer Parameters to be Configured by RRC", 3GPP Draft; R2-110857 L1 Parameters, 3rd Generation Partnership Project (3GPP), Mobile Competence Centre, 650, Route Des Lucioles, F-06921 Sophia-Antipolis Cedex, France, vol. RAN WG2, No. Taipei, Taiwan, Feb. 21, 2011, Feb. 15, 2011 (Feb. 15, 2011), 4 pages, XP050493634, [retrieved on Feb. 15, 2011] the whole document.
International Search Report and Written Opinion—PCT/US2015/053471—ISA/EPO—Apr. 5, 2016.

* cited by examiner

US 9,755,767 B2

MECHANISM TO MEASURE, REPORT, AND ALLOCATE A HIGHEST POSSIBLE RANK FOR EACH CELL IN A CARRIER AGGREGATION (CA) MODE RECEIVER-LIMITED USER EQUIPMENT (UE)

BACKGROUND

Field of Disclosure

Certain aspects of the claimed invention generally relate to dynamically configuring one or more cells based on signal quality measurements received from all antennas of a receiver-limited UE capable of operating in a CA mode.

Description of Related Art

Wireless communication networks are widely deployed to provide various communication services such as telephony, video, data, messaging, broadcasts, and so on. Such networks, which are usually multiple access networks, support communications for multiple users by sharing the available network resources. For example, one network may be a 3G (the third generation of mobile phone standards and technology) system, which may provide network service via any one of various 3G radio access technologies (RATs) including EVDO (Evolution-Data Optimized), 1×RTT (1 times Radio Transmission Technology, or simply 1×), W-CDMA (Wideband Code Division Multiple Access), UMTS-TDD (Universal Mobile Telecommunications System-Time Division Duplexing), HSPA (High Speed Packet Access), GPRS (General Packet Radio Service), or EDGE (Enhanced Data rates for Global Evolution). The 3G network is a wide area cellular telephone network that evolved to incorporate high-speed internet access and video telephony, in addition to voice calls. Furthermore, a 3G network may be more established and provide larger coverage areas than other network systems. Such multiple access networks may also include code division multiple access (CDMA) systems, time division multiple access (TDMA) systems, frequency division multiple access (FDMA) systems, orthogonal frequency division multiple access (OFDMA) systems, single-carrier FDMA (SC-FDMA) networks, 3rd Generation Partnership Project (3GPP) Long Term Evolution (LTE) networks, and Long Term Evolution Advanced (LTE-A) networks.

A wireless communication network may include a number of base stations that can support communication for a number of mobile stations. A mobile station (MS) may communicate with a base station (BS) via a downlink and an uplink. The downlink (or forward link) refers to the communication link from the base station to the mobile station, and the uplink (or reverse link) refers to the communication link from the mobile station to the base station. A base station may transmit data and control information on the downlink to a mobile station and/or may receive data and control information on the uplink from the mobile station.

A mobile station may have several receivers and antennas, which may be shared by different applications and/or frequency bands. A receiver-limited mobile station may refer to a mobile station in which a number of receivers is less than or equal to a number of antennas (N). Receiver-limited mobile stations may operate in M×N multiple-input multiple-output (MIMO) in a non-carrier aggregation (CA) mode, where M represents the number of antennas at a transmitting device. However, because the mobile station is "receiver-limited," it may only support M×(N/2) MIMO in CA.

In a receiver-limited UE, once CA is configured and activated, there may be no mechanism to check if the rank has improved on a primary cell (Pcell) because the receivers are assigned to a secondary cell (Scell), or vice versa. Under such circumstances, the network may not be utilizing the spatial multiplexing gain available and may be unnecessarily tying-up resources on the Scell.

Since M×N MIMO on either the Pcell or Scell may be preferred, what is needed are techniques and apparatus to detect a receiver-limited UE and activate and/or deactivate one or more cells accordingly.

SUMMARY

Certain aspects generally relate to a method for wireless communication. The method generally includes receiving signal quality measurements from all antennas of a receiver-limited UE capable of operating in a CA mode, wherein a number of receivers of the receiver-limited UE is less than or equal to a number of antennas of the UE and dynamically configuring at least one of a primary cell (Pcell) or a secondary cell (Scell) of the UE, based at least in part, on the received signal quality measurements.

Certain aspects generally relate to an apparatus for wireless communication. The apparatus generally includes means for receiving signal quality measurements from all antennas of a receiver-limited UE capable of operating in a CA mode, wherein a number of receivers of the receiver-limited UE is less than or equal to a number of antennas of the UE and means for dynamically configuring at least one of a Pcell or a Scell of the UE, based at least in part, on the received signal quality measurements.

Certain aspects generally relate to an apparatus for wireless communication. The apparatus generally includes at least one processor, a receiver, and a memory coupled to the at least one processor with instructions stored thereon. The receiver is generally configured to receive signal quality measurements from all antennas of a receiver-limited UE capable of operating in a CA mode, wherein a number of receivers of the receiver-limited UE is less than or equal to a number of antennas of the UE. The at least one processor is generally configured to dynamically configure at least one of a Pcell or a Scell of the UE, based at least in part, on the received signal quality measurements.

Certain aspects generally relate to a computer readable medium for wireless communications having instructions stored thereon, the instructions executable by one or more processors, for receiving signal quality measurements from all antennas of a receiver-limited UE capable of operating in a CA mode, wherein a number of receivers of the receiver-limited UE is less than or equal to a number of antennas of the UE and dynamically configuring at least one of a Pcell or a Scell of the UE, based at least in part, on the received signal quality measurements.

Certain aspects generally relate to a method for determining a rank for a Pcell and a Scell in a wireless communication network. The method generally includes sampling, in a first time interval, a reference signal in the Pcell using a first antenna set and sampling a reference signal in the Scell using a second antenna set, repeating the sampling step in a second time interval, combining the sampled reference signals from the first and second time intervals to determine a rank for the Pcell and the Scell, respectively, and reporting the determined rank of the Pcell and the Scell to the network.

Certain aspects generally relate to an apparatus for determining a rank for a Pcell and a Scell in a wireless communication network. The apparatus generally includes means for sampling, in a first time interval, a reference signal in the Pcell using a first antenna set and sampling a reference signal in the Scell using a second antenna set, means for repeating the sampling step in a second time interval, means for combining the sampled reference signals from the first and second time intervals to determine a rank for the Pcell and the Scell, respectively, and means for reporting the determined rank of the Pcell and the Scell to the network.

Certain aspects generally relate to an apparatus for determining a rank for a Pcell and a Scell in a wireless communication network. The apparatus generally includes at least one processor, and transmitter, and a memory having instructions stored thereon coupled to the at least one processor. The at least one processor is generally configured to sample, in a first time interval, a reference signal in the Pcell using a first antenna set and sampling a reference signal in the Scell using a second antenna set, repeat the sampling step in a second time interval, and combine the sampled reference signals from the first and second time intervals to determine a rank for the Pcell and the Scell, respectively. The transmitter is generally configured to report the determined rank of the Pcell and the Scell to the network.

Certain aspects generally relate to a computer readable medium for wireless communications having instructions stored thereon, the instructions executable by one or more processors, for sampling, in a first time interval, a reference signal in the Pcell using a first antenna set and sampling a reference signal in the Scell using a second antenna set, repeating the sampling step in a second time interval, combining the sampled reference signals from the first and second time intervals to determine a rank for the Pcell and the Scell, respectively and reporting the determined rank of the Pcell and the Scell to the network.

BRIEF DESCRIPTION OF THE DRAWINGS

So that the manner in which the above-recited features of the claimed invention can be understood in detail, a more particular description, briefly summarized above, may be had by reference to aspects, some of which are illustrated in the appended drawings. It is to be noted, however, that the appended drawings illustrate only certain typical aspects of the claimed invention and are therefore not to be considered limiting of its scope, for the description may admit to other equally effective aspects.

DETAILED DESCRIPTION

Figure 1:
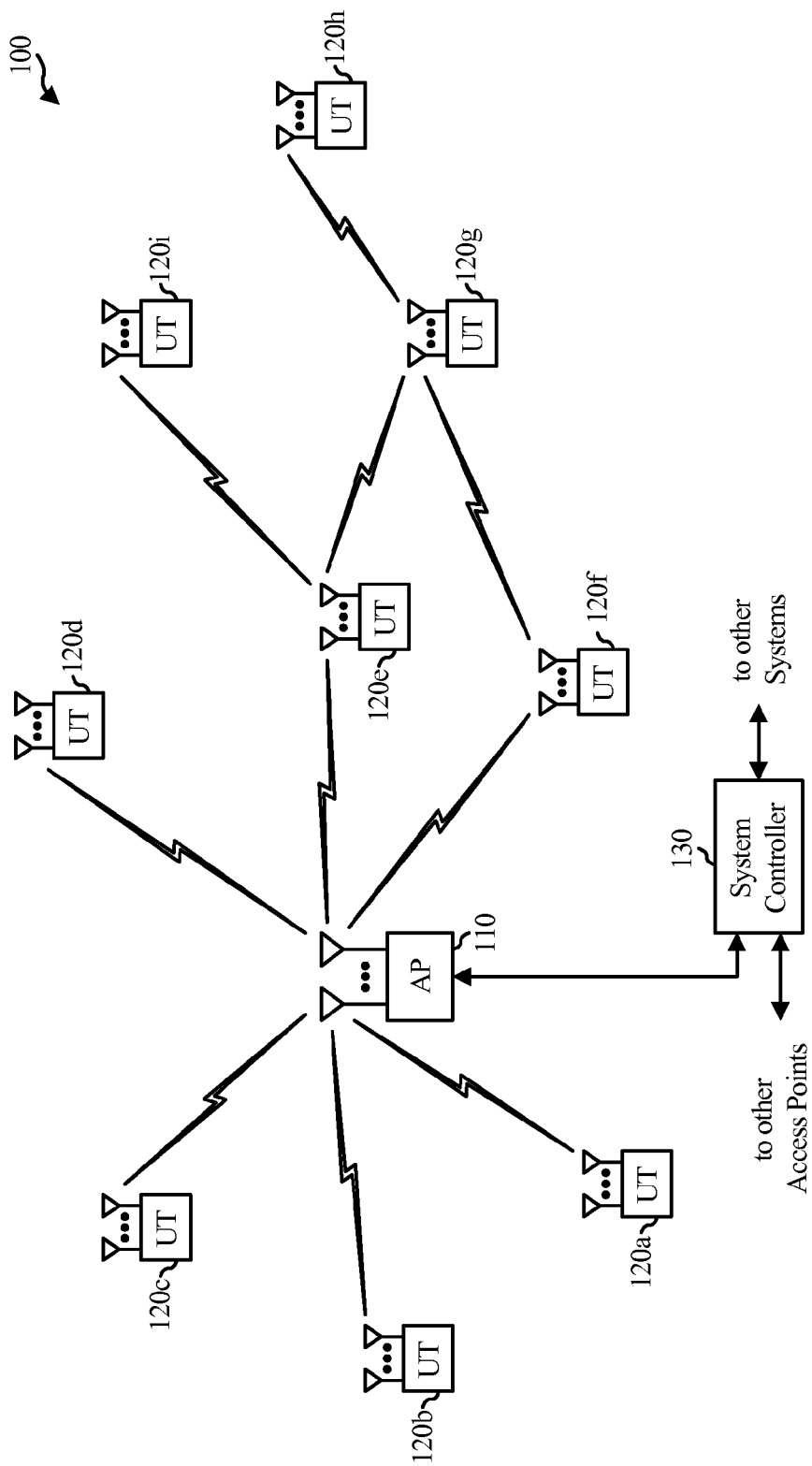
FIG. 1 illustrates an example wireless communications network in accordance with various embodiments of the present invention.

Aspects of the claimed invention relate to a network (e.g., an AP/eNB) dynamically configuring one or more cells (e.g., Pcell and/or Scell) via the AP/eNB based on information received from a receiver-limited UE, in an effort to allocate a highest rank for each cell. Thus, aspects of the present invention provide mechanisms to check, when CA is activated, if rank for a Pcell or Scell has improved such that the UE may switch from CA mode to multiple-input multiple-output (MIMO), thereby freeing up network resources.

Further, aspects of the claimed invention as described herein, provide methods and apparatus for a UE to construct a complete channel matrix for both a Pcell and Scell. For example, absent network-scheduled measurement gaps, UEs may use antenna swapping to measure reference signals from both the Pcell and Scell, in an effort to construct a complete (e.g., 4×4) channel matrix for both the Pcell and the Scell. Further, while aspects of the claimed invention may specifically relate to a 4×4 channel matrix, one of ordinary skill in the art would understand that the claimed invention may be implemented for any M×N channel matrix.

Various aspects of the claimed invention are described below. It should be apparent that the teachings herein may be embodied in a wide variety of forms and that any specific structure, function, or both being disclosed herein is merely representative. Based on the teachings herein, one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects.

The techniques described herein may be used in combination with various wireless technologies such as Code Division Multiple Access (CDMA), Orthogonal Frequency Division Multiplexing (OFDM), Time Division Multiple Access (TDMA), Spatial Division Multiple Access (SDMA), Single Carrier Frequency Division Multiple Access (SC-FDMA), Time Division Synchronous Code Division Multiple Access (TD-SCDMA), and the like. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement Institute of Electrical and Electronics Engineers (IEEE) 802.11 (Wireless Local Area Network (WLAN)), IEEE 802.16 (Worldwide Interoperability for Microwave Access (WiMAX)), Long Term Evolution (LTE) (e.g., in TDD and/or FDD modes), or some other standards. A TDMA system may implement Global System for Mobile Communications (GSM) or some other standards. These various standards are known in the art. The techniques described herein may also be implemented in any of various other suitable wireless systems using radio frequency (RF) technology, including Global Navigation Satellite System (GNSS), Bluetooth, IEEE 802.15 (Wireless Personal Area Network (WPAN)), Near Field Communication (NFC), Small Cell, Frequency Modulation (FM), and the like.

An Example Wireless System

FIG. 1 illustrates an example wireless communication system in which aspects of the claimed invention may be performed. For example, a receiver-limited UE 120 may communicate with a network. One or more APs 110 may define cellular regions (cells). The network may receive signal quality measurements from all antennas of the receiver-limited UE 120. The network may dynamically configure one or more cells (not illustrated in FIG. 1) based, at least in part, on the received signal quality measurements. According to aspects, an AP (e.g., eNB) may configure one or more cells including a Pcell and/or Scell based on the UE's CA capabilities. Further, activation and deactivation of the Scell may be performed by the AP using media access control (MAC) signaling.

FIG. 1 illustrates a wireless communications system 100 with access points and user terminals. For simplicity, only one access point 110 is shown in FIG. 1. An access point (AP) is generally a fixed station that communicates with the user terminals and may also be referred to as a base station (BS), an evolved Node B (eNB), or some other terminology. A user terminal (UT) may be fixed or mobile and may also be referred to as a mobile station (MS), an access terminal, user equipment (UE), a station (STA), a client, a wireless device, or some other terminology. A user terminal may be a wireless device, such as a cellular phone, a personal digital assistant (PDA), a handheld device, a wireless modem, a laptop computer, a tablet, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 may be equipped with a number $N_{ap}$ of antennas to achieve transmit diversity for downlink transmissions and/or receive diversity for uplink transmissions. A set $N_u$ of selected user terminals 120 may receive downlink transmissions and transmit uplink transmissions. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

Wireless system 100 may be a time division duplex (TDD) system or a frequency division duplex (FDD) system. For a TDD system, the downlink and uplink may share the same frequency band. For an FDD system, the downlink and uplink use different frequency bands. System 100 may also utilize a single carrier or multiple carriers for transmission. Each user terminal may be equipped with a single antenna (e.g., in order to keep costs down) or multiple antennas (e.g., where the additional cost can be supported).

Figure 2:
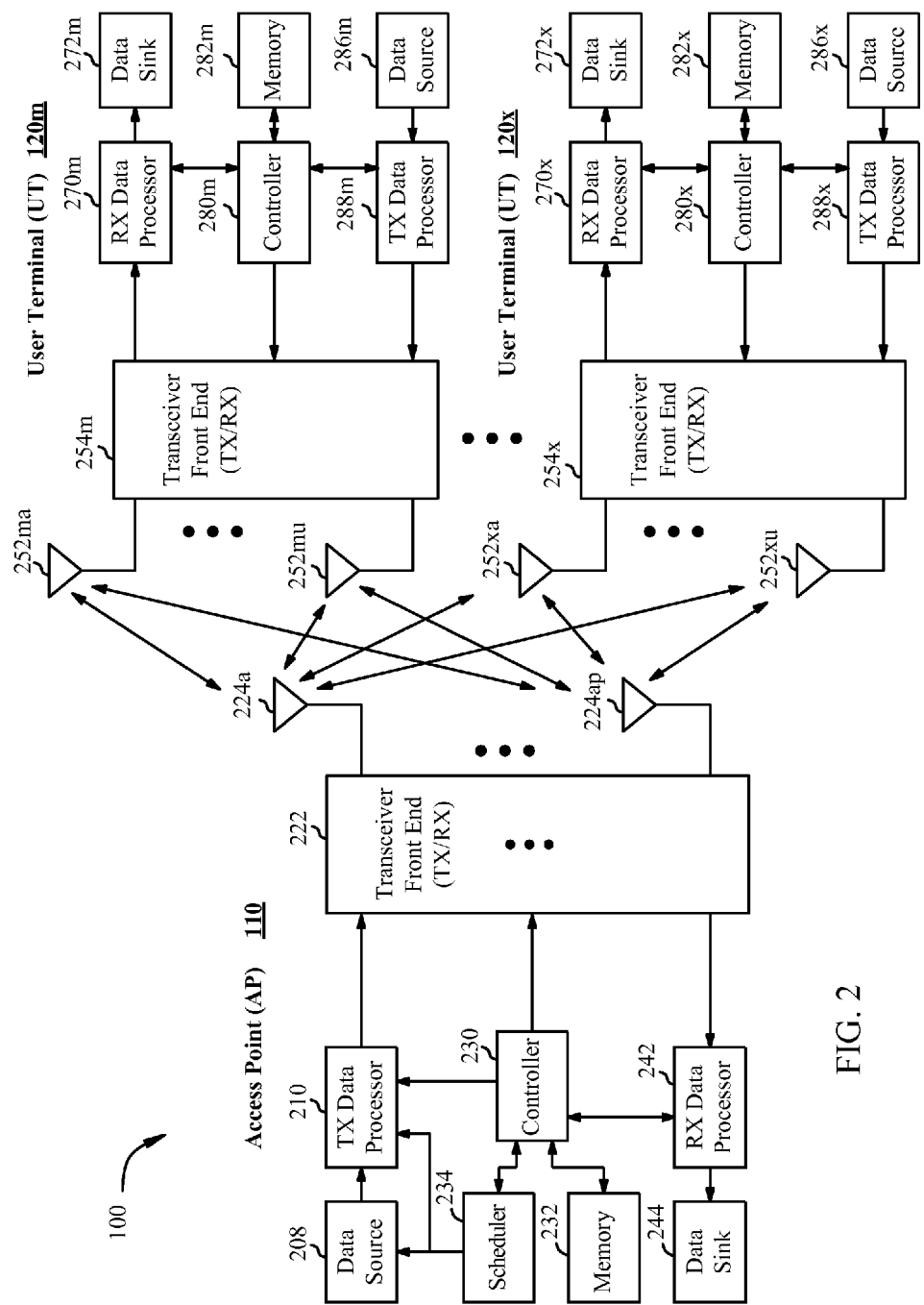
FIG. 2 is a block diagram of an example AP and user terminals in accordance with various embodiments of the present invention.

FIG. 2 illustrates an example access point and user terminal, which may be used by to perform aspects of the claimed invention. For example, a receiver-limited UE may include one or more modules illustrated at UT 120. The network may receive signal quality measurements from all antennas of the receiver-limited user equipment UE, via an AP, and may dynamically configure one or more cells based, at least in part, on the received signal quality measurements. As shown in FIG. 1, the network may include one or more access points, such as AP 110. Further, absent network-scheduled measurement gaps, the UT 120, while operating in a CA mode, may still construct a full channel matrix of both the Pcell and Scell by swapping antennas as claimed and described herein.

FIG. 2 shows a block diagram of access point 110 and two user terminals 120m and 120x in wireless system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. Beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up}\}$ for the user terminal based on the coding and modulation schemes associated with the rate selected for the user terminal and provides a data symbol stream $\{s_{up}\}$ for one of the $N_{ut,m}$ antennas. A transceiver front end (TX/RX) 254 (also known as a radio frequency front end (RFFE)) receives and processes (e.g., converts to analog, amplifies, filters, and frequency upconverts) a respective symbol stream to generate an uplink signal. The transceiver front end 254 may also route the uplink signal to one of the $N_{ut,m}$ antennas for transmit diversity via an RF switch, for example. The controller 280 may control the routing within the transceiver front end 254.

A number $N_{up}$ of user terminals may be scheduled for simultaneous transmission on the uplink. Each of these user terminals transmits its set of processed symbol streams on the uplink to the access point.

At access point 110, $N_{ap}$ antennas 224a through 224ap receive the uplink signals from all $N_{up}$ user terminals transmitting on the uplink. For receive diversity, a transceiver front end 222 may select signals received from one of the antennas 224 for processing. For certain aspects of the present disclosure, a combination of the signals received from multiple antennas 224 may be combined for enhanced receive diversity. The access point's transceiver front end 222 also performs processing complementary to that performed by the user terminal's transceiver front end 254 and provides a recovered uplink data symbol stream. The recovered uplink data symbol stream is an estimate of a data symbol stream $\{s_{up}\}$ transmitted by a user terminal. An RX data processor 242 processes (e.g., demodulates, deinterleaves, and decodes) the recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 may provide a downlink data symbol streams for one of more of the $N_{dn}$ user terminals to be transmitted from one of the $N_{ap}$ antennas. The transceiver front end 222 receives and processes (e.g., converts to analog, amplifies, filters, and frequency upconverts) the symbol stream to generate a downlink signal. The transceiver front end 222 may also route the downlink signal to one or more of the $N_{ap}$ antennas 224 for transmit diversity via an RF switch, for example. The controller 230 may control the routing within the transceiver front end 222.

At each user terminal 120, $N_{ut,m}$ antennas 252 receive the downlink signals from access point 110. For receive diversity at the user terminal 120, the transceiver front end 254 may select signals received from one of the antennas 252 for processing. For certain aspects of the present disclosure, a combination of the signals received from multiple antennas 252 may be combined for enhanced receive diversity. The user terminal's transceiver front end 254 also performs processing complementary to that performed by the access point's transceiver front end 222 and provides a recovered downlink data symbol stream. An RX data processor 270 processes (e.g., demodulates, deinterleaves, and decodes) the recovered downlink data symbol stream to obtain decoded data for the user terminal.

Those skilled in the art will recognize the techniques described herein may be generally applied in systems utilizing any type of multiple access schemes, such as TDMA, SDMA, Orthogonal Frequency Division Multiple Access (OFDMA), CDMA, SC-FDMA, and combinations thereof.

Figure 3:
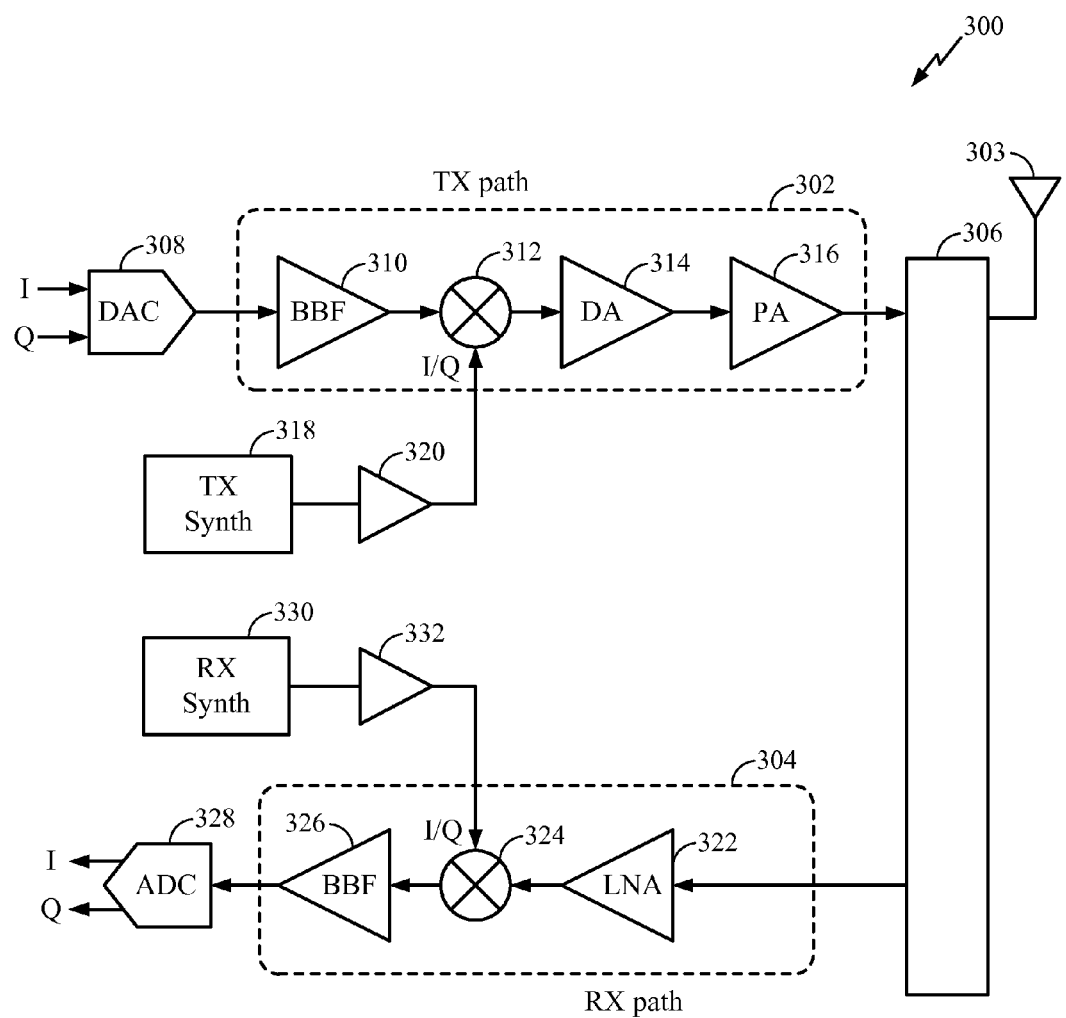
FIG. 3 is a block diagram of an example transceiver front end in accordance with various embodiments of the present invention.

FIG. 3 illustrates example transceiver front end that may be used to implement aspects of the claimed invention.

FIG. 3 is a block diagram of an example transceiver front end 300, such as transceiver front ends 222, 254 in FIG. 2, in accordance with certain aspects of the present disclosure. The transceiver front end 300 includes a transmit (TX) path 302 (also known as a transmit chain) for transmitting signals via one or more antennas and a receive (RX) path 304 (also known as a receive chain) for receiving signals via the antennas. When the TX path 302 and the RX path 304 share an antenna 303, the paths may be connected with the antenna via an interface 306, which may include any of various suitable RF devices, such as a duplexer, a switch, a diplexer, and the like.

Receiving in-phase (I) or quadrature (Q) baseband analog signals from a digital-to-analog converter (DAC) 308, the TX path 302 may include a baseband filter (BBF) 310, a mixer 312, a driver amplifier (DA) 314, and a power amplifier 316. The BBF 310, the mixer 312, and the DA 314 may be included in a radio frequency integrated circuit (RFIC), while the PA 316 is often external to the RFIC. The BBF 310 filters the baseband signals received from the DAC 308, and the mixer 312 mixes the filtered baseband signals with a transmit local oscillator (LO) signal to convert the baseband signal of interest to a different frequency (e.g., upconvert from baseband to RF). This frequency conversion process produces the sum and difference frequencies of the LO frequency and the frequency of the signal of interest. The sum and difference frequencies are referred to as the beat frequencies. The beat frequencies are typically in the RF range, such that the signals output by the mixer 312 are typically RF signals, which are amplified by the DA 314 and by the PA 316 before transmission by the antenna 303.

The RX path 304 includes a low noise amplifier (LNA) 322, a mixer 324, and a baseband filter (BBF) 326. The LNA 322, the mixer 324, and the BBF 326 may be included in a radio frequency integrated circuit (RFIC), which may or may not be the same RFIC that includes the TX path components. RF signals received via the antenna 303 may be amplified by the LNA 322, and the mixer 324 mixes the amplified RF signals with a receive local oscillator (LO) signal to convert the RF signal of interest to a different baseband frequency (i.e., downconvert). The baseband signals output by the mixer 324 may be filtered by the BBF 326 before being converted by an analog-to-digital converter (ADC) 328 to digital I or Q signals for digital signal processing.

While it is desirable for the output of a LO to remain stable in frequency, tuning to different frequencies indicates using a variable-frequency oscillator, which involves compromises between stability and tunability. Contemporary systems employ frequency synthesizers with a voltage-controlled oscillator (VCO) to generate a stable, tunable LO with a particular tuning range. Thus, the transmit LO is typically produced by a TX frequency synthesizer 318, which may be buffered or amplified by amplifier 320 before being mixed with the baseband signals in the mixer 312. Similarly, the receive LO is typically produced by an RX frequency synthesizer 330, which may be buffered or amplified by amplifier 332 before being mixed with the RF signals in the mixer 324.

Example Mechanism to Allocate a Highest Possible Rank for Each Cell in a CA Mode Receiver-Limited UE Cellular devices that have a same number of antennas (N) as receivers and which support carrier aggregation (CA) may operate in M×N MIMO in non-CA mode, where M is a number of antennas at the transmitter and may only support M×(N/2) MIMO in CA, because the UE is "receiver-limited." In a receiver-limited UE, once CA is configured and activated, there may be no mechanism to check if the rank has improved on the primary cell (Pcell) because, for example, the receivers are assigned to a secondary cell (Scell) (or vice versa). Under such circumstances, the network may not be utilizing the spatial multiplexing gain available and may be unnecessarily tying-up resources, for example, on the Scell.

As described above, cellular devices (e.g., UEs) may have several receivers and antennas. The multiple receivers may be shared between different applications and/or frequency bands, such that certain UEs have more antennas available for cellular purposes than RF receivers. As described above, a problem may arise where a UE allocates its receivers to a Scell and is unable to maximize the spatial multiplexing gain the UE is capable of.

Figure 4:
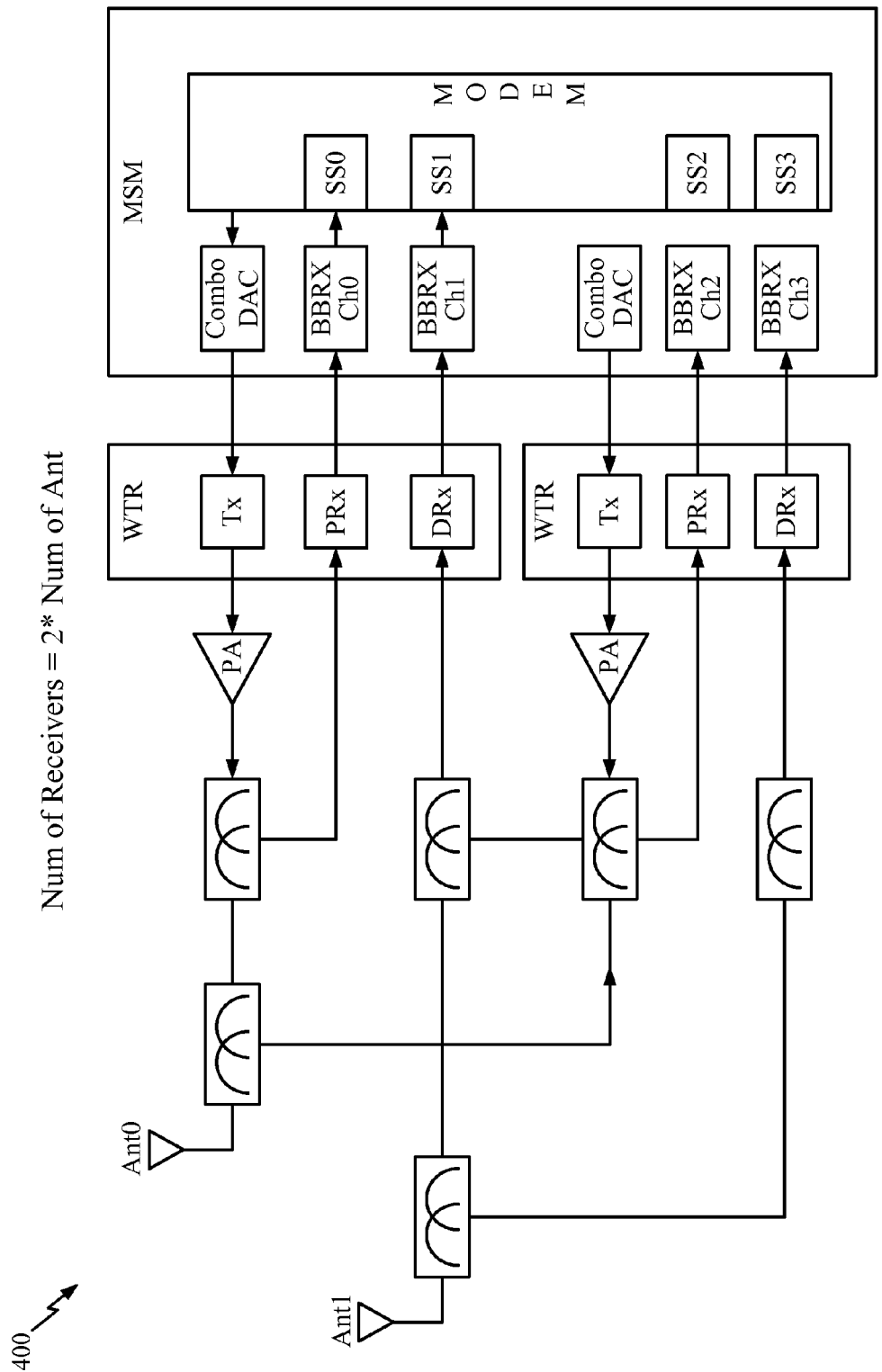
FIG. 4 illustrates an example of a non-receiver-limited UE, according to various embodiments of the present invention.

FIG. 4 illustrates an example design architecture 400 of a non-receiver-limited UE. The design architecture 400 may support 2×2 MIMO in CA as well as non-CA mode. As illustrated, the duplexers allow inter-band Pcells and Scells to share antennas. For the non-receiver limited UE shown in FIG. 4, the number of receivers (4 receivers illustrated) equals 2*the number of antennas (2 antennas illustrated), as illustrated in FIG. 4.

Figure 5:
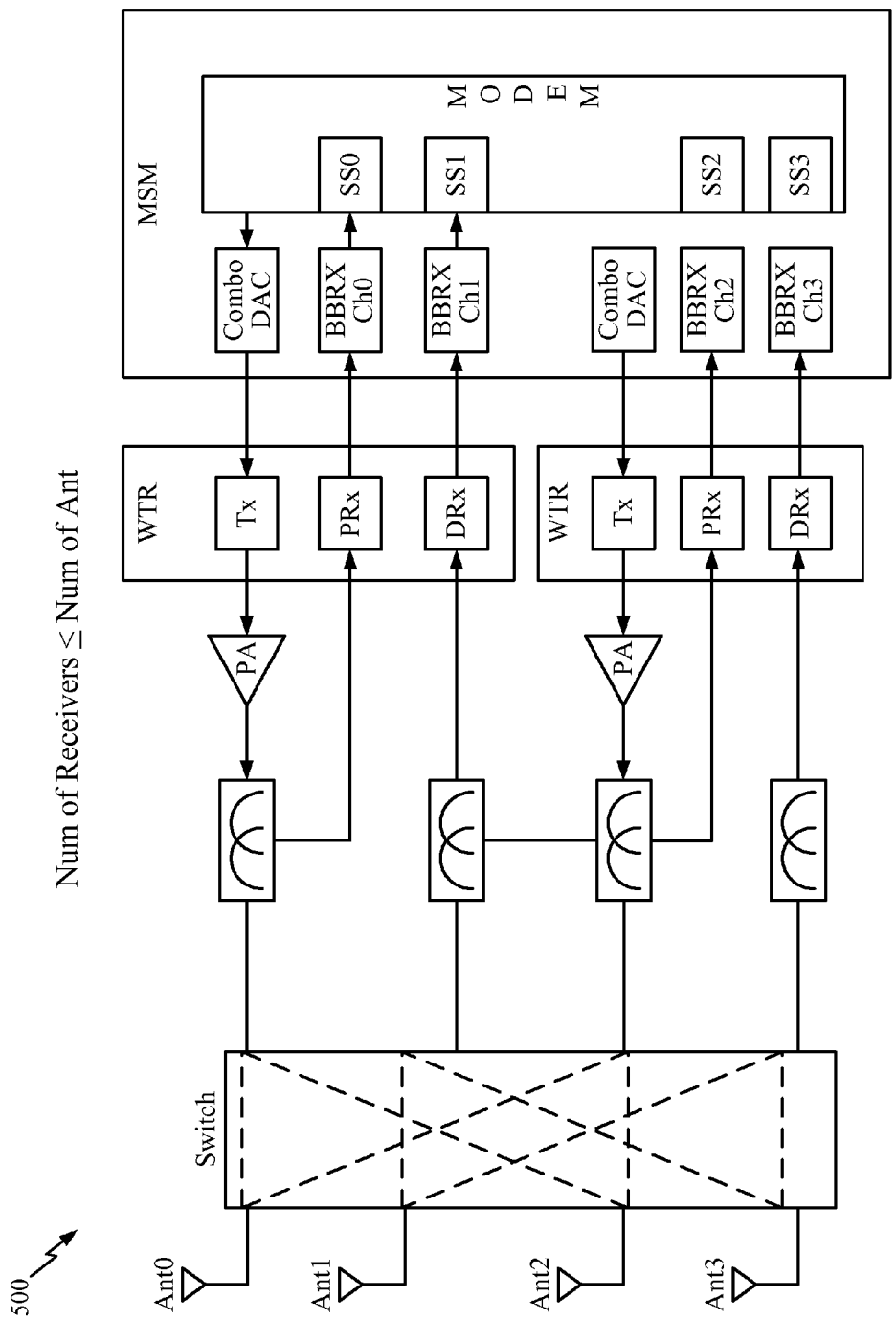
FIG. 5 illustrates an example of a receiver-limited UE, according to various embodiments of the present invention.

FIG. 5 illustrates an example design architecture 500 of a receiver-limited UE, according to aspects of the claimed invention. The design architecture 500 may support 4×4 MIMO in non-CA mode but may only support 2×2 MIMO in CA mode. In other words, even with duplexers the UE may not support 4×4 MIMO and CA mode due to its RF receiver limitation. The UE of FIG. 5 is receiver-limited as the number of receivers (4 receivers illustrated) is less than or equal to the number of antennas (4 antennas illustrated).

A UE having the design architecture illustrated in and described with reference to FIG. 5 may need to optionally switch between 4×4 MIMO and CA. In CA scenarios, if a Category 5 (CAT5) or higher UE reports a rank 4 on the Pcell, the network may free-up Scell resources by switching from the CA mode to 4×4 MIMO on the Pcell. The switch from CA to MIMO may occur at a transmission time interval (TTI) every 1 ms.

When CA is activated, however, the receivers of the UE are split between the Pcell and Scell. Accordingly, there is no mechanism to check if the rank has improved for either the Pcell or Scell in an effort to determine to switch from CA to MIMO.

As described above, a receiver-limited UE, as illustrated in FIG. 5, may have a number of antennas (N) that is greater than or equal to the number of as receivers. Accordingly, the receiver-limited UE and may support CA in M×N MIMO in non-CA mode, but may only support M×(N/2) MIMO in CA mode. As M×N MIMO may be preferred over M×(N/2) MIMO, aspects of the claimed invention provide mechanisms where the network may detect a receiver-limited UE and configure and/or activate the one or more cells or MIMO based on this knowledge. Accordingly, the network may configure measurement gaps for rank determination by a UE, as necessary. According to aspects of the claimed invention, and as will be described in more detail herein, the UE may perform periodic antenna switching to measure the rank on the Pcell and Scell when gaps are not available (e.g., when measurements gaps are not scheduled by the network) in an effort to construct a full channel matrix for both the Pcell and the Scell.

According to aspects, a UE with four antennas may be operating in a CA mode. The Scell may be configured and activated. The UE may measure signal quality on all 4 antennas and may report the rank to the network (e.g., on the Pcell) in a first rank report. If the reported rank is 4, the network may choose to deactivate the Scell and assign 4×4 MIMO to the UE on the Pcell. If the reported rank changes to a lower value at any time after the first rank report, the network may choose to move to a lower order MIMO, and activate the Scell for CA. As described above, the switch between modes (CA and MIMO) may be performed at a TTI level. According to aspects, Scell activation/deactivation may be performed at the MAC level at a TTI level.

According to aspects, the UE may measure signal quality on both the Pcell and Scell and report the rank of both cells to the network. For example, a first rank report may include a reported rank of the Pcell and a second rank report may include a reported rank of the Scell. If the reported rank is 4 on the Scell, the network may choose to handover to the Scell, deactivate CA, and assign 4×4 MIMO on the Scell. If the reported rank of the Scell changes to a lower value at any time after the second rank report, the network may choose to move to a lower order MIMO and activate CA.

A UE supporting 4×4 MIMO may achieve similar throughput as the UE supporting 2×2 MIMO in CA mode. For example, the peak throughput for a 10 MHz cell with 4×4 MIMO support (4 layers) is 150 Mbps. The peak throughout in CA mode for a 10 MHz Pcell and 10 MHz Scell with 2×2 MIMO is around 150 Mbps. Therefore, aspects of the claimed invention may advantageously free up resources on the Scell, thereby increasing the capacity of the system, while maintaining similar throughput. Further, changing (e.g., switching) from 4×4 MIMO to 2×2 MIMO in CA mode may be performed at the MAC level, thereby allowing fast channel adaptation.

According to aspects of the claimed invention, the network may detect a receiver-limited UE by taking into account the UE category and CA MIMO capability. For example, when a Category 5 or higher UE reports only M×2 MIMO capability for CA band combinations, where M is the number of antennas at the transmitter, the UE is considered to be receiver-limited for this band combination. The network may configure and/or activate the Scell based on the CA scenario and Scell state as described below.

According to a first scenario, the CA capable UE may be operating in a non-CA mode. An eNB communicating with the UE may have a 4×4 antenna configuration. If the UE reports Rank 4 (e.g., rank indicator (RI)=4) on the Pcell, the network may not configure and activate the Scell. Instead, the network may configure and activate the Scell when the UE reports Rank 2 for the Pcell to the network, as 4×4 MIMO for the Pcell may not be possible at that time.

According to a second scenario, the Scell may be configured but not activated. In this case, the UE may be able to measure the rank supported by periodically using Scell antenna ports and tuning away receivers for calculating a M×N (e.g., 4×4) channel matrix for the Pcell. Once the UE reports Rank 4, the network has the option of removing the Scell configuration and providing 4×4 grants to the UE. The network may not activate the Scell as long as the UE is reporting Rank 4 capabilities for the Pcell. For Scell periodic measurements, the network may configure measurement gaps. Additionally or alternatively, the network may provide 2×2 grants so that the UE can measure the Scell on the available RF chains. This may also be achieved by the UE periodically dropping the rank capability to 2.

According to a third scenario, the Scell may be configured and activated. In this case, the UE may use measurements gaps to measure M×4 channel matrix (e.g., Rank 4) supported for both the Pcell and Scell. If the Pcell and/or Scell are strong and gaps are not scheduled for inter-frequency/inter-band/RAT neighbors, the network may initiate gaps for measuring the highest possible rank for receiver-limited UEs. According to aspects when gaps are not able to be scheduled (e.g., during a CA active state), the UE may use antenna switching, as will be described in more detail with reference to FIG. 6, in an effort to determine the channel state on all antennas. The UE my combine the channel state received from all antennas in an effort to determine the highest rank for both the Pcell and Scell. Once the UE reports a Rank 4, for example, for the Pcell, the network may deactivate and/or remove the Scell configuration.

Figure 6:
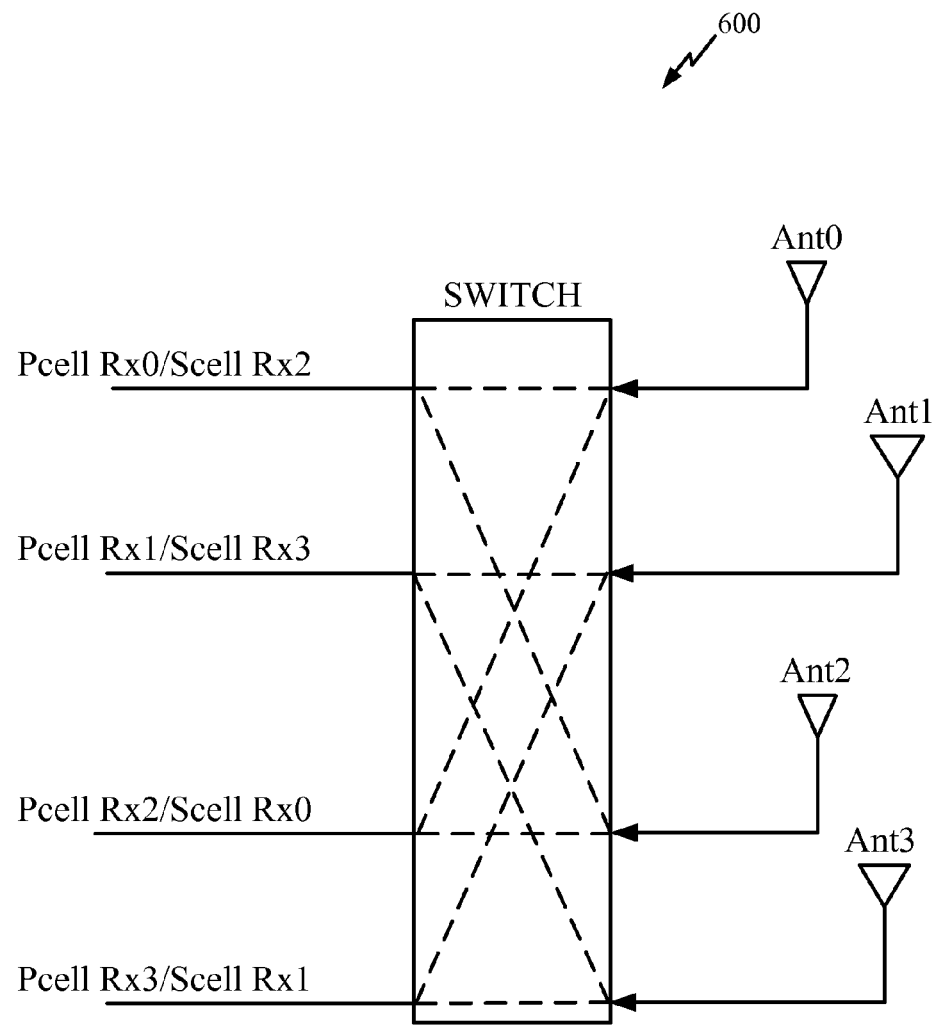
FIG. 6 illustrates an example architecture of a UE which utilizes a switch such that all antennas may be used to measure a Pcell and Scell without the use of assigned measurement gaps, according to aspects various embodiments of the present invention.

FIG. 6 illustrates an example of swapping 600 antennas at a UE in an effort to determine a rank for the Pcell and Scell, according to aspects of the claimed invention. During a CA activated state, measurement gaps may not be available, since the Scell is continuously active. According to aspects of the claimed invention, the UE may still determine a rank of the Pcell and Scell when the network has not scheduled measurement gaps.

In a CA active state, the UE may use two antennas for measuring a reference signal in the Pcell and two antennas for measuring a reference signal in the Scell. Antenna switching (e.g., swapping) may be used to sample the Pcell reference signal from Scell antennas and sample the Scell reference signal from Pcell antennas, thereby constructing a complete 4×4 channel matrix for both the Pcell and Scell.

For example, during a first time interval (e.g., t1), Antennas 0 and 1 may be used to sample a first and second (Rx0 and Rx1, respectively) channel of the Pcell. During a different time interval (e.g., a second time interval, t2), Antennas 2 and 3 may be used to sample a third and fourth (Rx2 and Rx3, respectively) channel of the Pcell. The UE may combine the measurements from Antennas 0-4 to determine a rank for the Pcell.

Similarly, during a time interval, for example, during the first time interval t1, while Antennas 0 and 1 may be used to sample a first and second (Rx0 and Rx1, respectively) channel of the Pcell, Antennas 2 and 3 may be used to sample a first and second (Rx0 and Rx1, respectively) channel of the Scell. During the different time interval (e.g., second time interval, t2), Antennas 0 and 1 may be used to measure the Scell (e.g., Rx2 and Rx3 of the Scell). The UE may combine the measurements from Antennas 0-4 to determine a rank for the Scell.

In this manner, when both the Pcell and Scell are CA activated, the UE may determine a rank of the Pcell and Scell without network-scheduled measurement gaps. As described above, the UE may swap antennas to determine a rank for both the Pcell and Scell, thereby constructing a complete 4×4 channel matrix for both the Pcell and Scell. While a 4×4 channel matrix is used as an example for a full channel matrix, one of ordinary skill in the art would understand that aspects of the claimed invention may be implemented for any M×N channel matrix.

Figure 7:
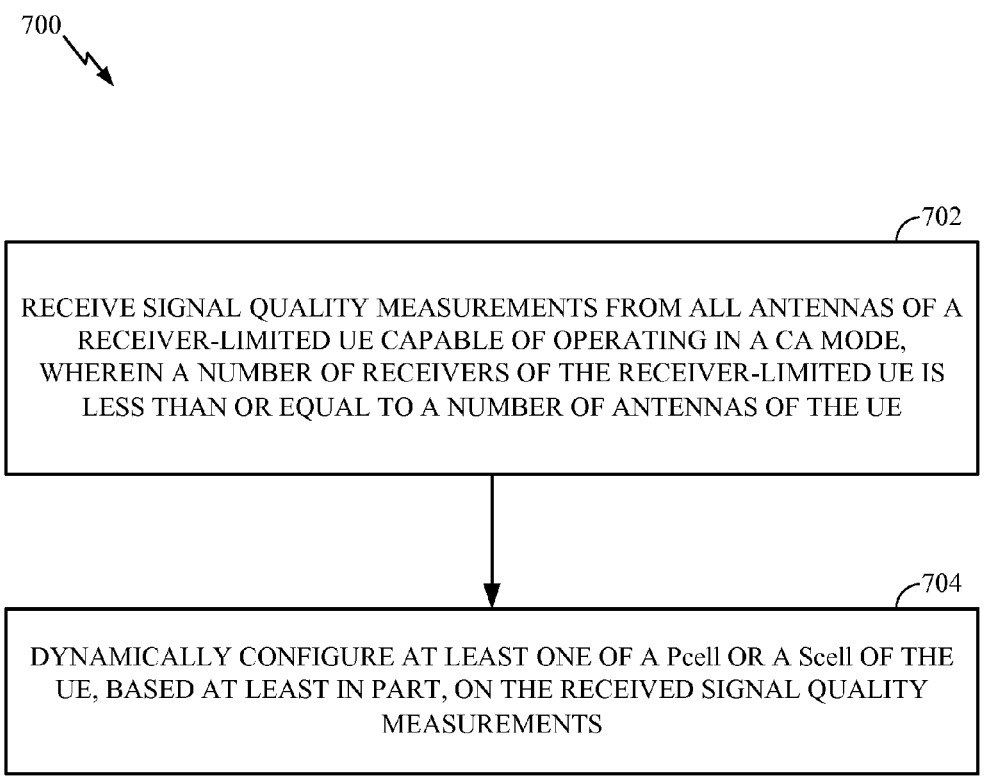
FIG. 7 illustrates operations performed, for example, by network, according to various embodiments of the present invention.

FIG. 7 illustrates example operations, performed for example, by a network (e.g., an AP, such as APs 110 of FIGS. 1 and 2) in communication with a receiver-limited UE, according to aspects of the claimed invention. One or more modules of AP 110 of FIG. 2 may perform the operations. For example, Tx/Rx 222, antennas 224, controller 230, memory 232, and processors 210 and 242 may perform the operations described herein.

At 702, the network may receive signal quality measurements from all antennas of a receiver-limited UE capable of operating in a CA mode. A UE may be receiver-limited when the number receivers at the UE is less than or equal to a number of antennas at the UE.

At 704, the network may dynamically configure one or more cells (e.g., Pcell and/or Scell) based, at least in part, on the received signal quality measurements.

According to aspects of the claimed invention, receiving the signal quality measurement includes receiving a first rank report from the UE for a Pcell when a Scell is configured. The first rank report may include a reported rank of the Pcell. When the reported rank of the Pcell equals the number of antennas at the UE, the network may deactivate the Scell and configure the UE for MIMO operation on the Pcell.

According to aspects of the claimed invention, the network may further configure the UE for a lower-order MIMO operation and activate the Scell when a subsequently reported rank of the Pcell changes to a lower value as compared to the reported rank of the Pcell in the first rank report.

According to aspects of the claimed invention, the network may dynamically configure the one or more cells by scheduling at least one of activation or deactivation of a Scell at a TTI level.

In addition to receiving the first rank report, which includes a reported rank of the Pcell from the UE for the Pcell, the network may receive a second rank report when the Scell is configured. The second rank report may include a report rank of the Scell. When the reported rank for the Scell equals a number of antennas at the UE, the network may deactivate CA and handover the UE to the Scell for MIMO operation on the Scell.

Further, the network may configure the UE for a lower-order MIMO operation and activate CA when a subsequently reported rank of the Scell drops to a lower value as compared to the reported rank of the Scell in the second rank report.

As described above, the network (e.g., an AP) may detect a receiver-limited UE based, at least in part, on a UE category and reported MIMO capability. For example, the network may detected a UE as being receiver-limited when it is a Category 5 or higher UE and reports a maximum of 2×2 MIMO support for each CA band combination.

Figure 8:
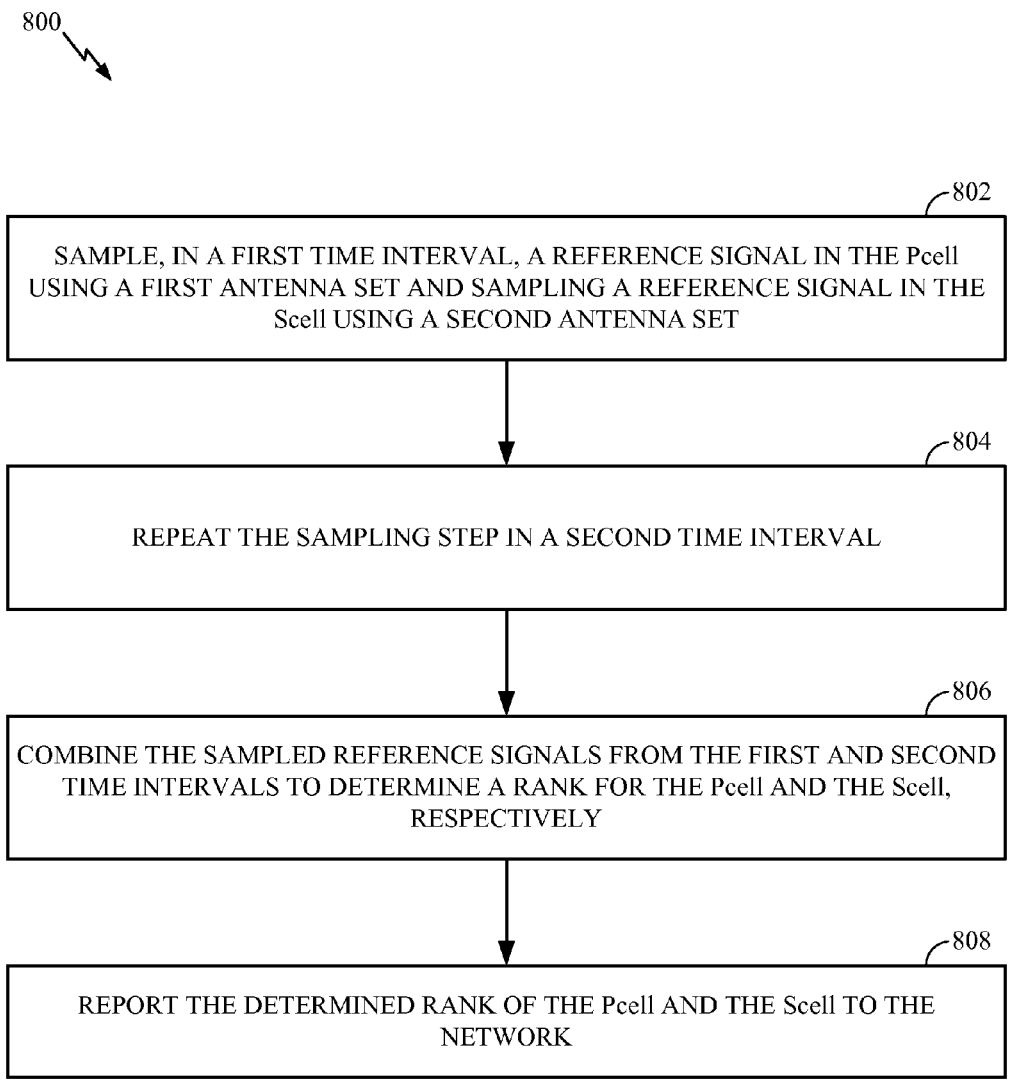
FIG. 8 illustrates operations performed, for example, by a UE, according to various embodiments of the present invention.

FIG. 8 illustrates operations 800, performed, for example by a UE for determining a rank for a Pcell and a Scell. The operations may be performed by one or more modules of UT 120 in FIG. 2. For example, antenna 252, Tx/Rx 254, controller 280, memory 282, and processors 270 and 288 may perform the operations described herein.

At 802, the UE may sample, in a first time interval, a reference signal in the Pcell using a first antenna set and sampling a reference signal in the Scell using a second antenna set. At 804, the UE may repeat the sampling step in a second time interval. As described with reference to FIG. 6, the UE may repeat the sampling step in the second time interval by sampling the reference signal in the Pcell using the second antenna set and sampling the reference signal in the Scell using the first antenna set.

At 806, the UE may combine the sampled reference signals from the first and second time intervals to determine a rank for the Pcell and the Scell, respectively. At 808, the UE may report the determined rank of the Pcell and the Scell to the network.

As described above, the UE performing the operations illustrated in FIG. 8 may be a UE operating in a CA mode. The UE may not have network-scheduled measurement gaps. Absent network-scheduled measurement gaps, the UE may be able to construct a full channel matrix for the Pcell and the Scell using aspects of the claimed invention.

In this manner, the UE may determine a rank of the Pcell and the Scell by swapping (e.g., switching) antennas. In other words, an antenna switch may be used such that Pcell and Scell reference signals may be measured from all antennas at a UE even when the UE does not have scheduled measurement gaps in which to measure reference signals on the Pcell or Scell.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the claimed invention may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication, comprising:
   receiving signal quality measurements from all antennas of a receiver-limited user equipment (UE) capable of operating in a carrier aggregation (CA) mode, wherein a number of receivers of the UE is less than or equal to a number of antennas of the UE; and
   dynamically configuring at least one of a primary cell (Pcell) or a secondary cell (Scell) of the UE, based at least in part, on the received signal quality measurements, wherein the UE is a Category 5 or higher UE and reports a maximum 2×2 multiple-input multiple-output (MIMO) support for each CA band combination.

2. The method of claim 1, wherein receiving the signal quality measurements comprises:
   receiving a first rank report from the UE for the Pcell when the Scell is configured, wherein the first rank report includes a reported rank of the Pcell, and
   wherein the dynamically configuring comprises deactivating the Scell and configuring the UE for MIMO operation on the Pcell, when the reported rank of the Pcell equals the number of antennas at the UE.

3. The method of claim 2, further comprising:
   configuring the UE for a lower-order MIMO operation and activating the Scell when a subsequently reported rank for the Pcell drops to a lower value as compared to the reported rank of the Pcell in the first rank report.

4. The method of claim 1, wherein dynamically configuring comprises:
   scheduling at least one of activation or deactivation of the Scell at a transmission time interval (TTI) level.

5. The method of claim 1, wherein receiving the signal quality measurements comprises:
   receiving a first rank report from the UE for the Pcell when the Scell is configured, wherein the first rank report includes a reported rank of the Pcell, and
   receiving a second rank report from the UE for the Scell, wherein the second rank report includes a reported rank of the Scell,
   wherein the dynamically configuring comprises deactivating CA and handing over the UE to the Scell for MIMO operation on the Scell, when the reported rank for the Scell equals the number of antennas at the UE.

6. The method of claim 5, further comprising:
   configuring the UE for a lower-order MIMO operation and activating CA when a subsequently reported rank of the Scell drops to a lower value as compared to the reported rank of the Scell in the second rank report.

7. A method for determining a rank for a primary cell (Pcell) and a secondary cell (Scell) in a wireless communication network, the method comprising:
   sampling, in a first time interval, a reference signal in the Pcell using a first antenna set and sampling a reference signal in the Scell using a second antenna set;
   repeating the sampling step in a second time interval;

combining the sampled reference signals from the first and second time intervals to determine a rank for the Pcell and the Scell, respectively; and reporting the determined rank of the Pcell and the Scell to the network.

8. The method of claim 7, wherein the method is performed by a user equipment (UE) in a carrier aggregation (CA) mode.

9. The method of claim 7, wherein the method is performed by a user equipment (UE) that does not have measurement gaps scheduled by the network.

10. The method of claim 7, wherein repeating the sampling step in the second time interval comprises:

sampling the reference signal in the Pcell using the second antenna set and sampling the reference signal in the Scell using the first antenna set.

11. An apparatus for wireless communication, comprising:

means for receiving signal quality measurements from all antennas of a receiver-limited user equipment (UE) capable of operating in a carrier aggregation (CA) mode, wherein a number of receivers of the UE is less than or equal to a number of antennas of the UE; and means for dynamically configuring at least one of a primary cell (Pcell) or a secondary cell (Scell) of the UE, based at least in part, on the received signal quality measurements wherein the UE is a Category 5 or higher UE and reports a maximum 2×2 multiple-input multiple-output (MIMO) support for each CA band combination.

12. The apparatus of claim 11, wherein the means for receiving the signal quality measurements comprises means for receiving a first rank report from the UE for the Pcell when the Scell is configured, wherein the first rank report includes a reported rank of the Pcell, and wherein the means for dynamically configuring comprises means for deactivating the Scell and means for configuring the UE for MIMO operation on the Pcell, when the reported rank of the Pcell equals the number of antennas at the UE.

13. The apparatus of claim 12, further comprising:

means for configuring the UE for a lower-order MIMO operation and means for activating the Scell when a subsequently reported rank for the Pcell drops to a lower value as compared to the reported rank of the Pcell in the first rank report.

14. The apparatus of claim 11, wherein the means for dynamically configuring comprises:

means for scheduling at least one of activation or deactivation of the Scell at a transmission time interval (TTI) level.

15. The apparatus of claim 11, wherein the means for receiving the signal quality measurements comprises:

means for receiving a first rank report from the UE for the Pcell when the Scell is configured, wherein the first rank report includes a reported rank of the Pcell, and means for receiving a second rank report from the UE for the Scell, wherein the second rank report includes a reported rank of the Scell, wherein the means for dynamically configuring comprises means for deactivating CA and means for handing over the UE to the Scell for MIMO operation on the Scell, when the reported rank for the Scell equals the number of antennas at the UE.

16. The apparatus of claim 15, further comprising:

means for configuring the UE for a lower-order MIMO operation and means for activating CA when a subsequently reported rank of the Scell drops to a lower value as compared to the reported rank of the Scell in the second rank report.

17. An apparatus for determining a rank for a primary cell (Pcell) and a secondary cell (Scell) in a wireless communication network, the apparatus comprising:

means for sampling, in a first time interval, a reference signal in the Pcell using a first antenna set and sampling a reference signal in the Scell using a second antenna set;

means for repeating the sampling step in a second time interval;

means for combining the sampled reference signals from the first and second time intervals to determine a rank for the Pcell and the Scell, respectively; and means for reporting the determined rank of the Pcell and the Scell to the network.

18. The apparatus of claim 17, wherein the apparatus is a user equipment (UE) in a carrier aggregation (CA) mode.

19. The apparatus of claim 17, wherein the apparatus is a user equipment (UE) that does not have measurement gaps scheduled by the network.

20. The apparatus of claim 17, wherein the means for repeating the sampling step in the second time interval comprises:

means for sampling the reference signal in the Pcell using the second antenna set and sampling the reference signal in the Scell using the first antenna set.

* * * * *